US011846076B2

(12) United States Patent
von Schönebeck et al.

(10) Patent No.: US 11,846,076 B2
(45) Date of Patent: Dec. 19, 2023

(54) SELF-PROPELLED MILLING MACHINE HAVING A MACHINE FRAME AND A CONVEYOR DEVICE FOR REMOVING MATERIAL

(71) Applicant: Wirtgen GmbH, Windhagen (DE)

(72) Inventors: Winfried von Schönebeck, Kalenborn (DE); Sascha Schwippert, Königswinter-Oelinghoven (DE)

(73) Assignee: WIRTGEN GMBH

( * ) Notice: Subject to any disclaimer, the term of this patent is extended or adjusted under 35 U.S.C. 154(b) by 0 days.

(21) Appl. No.: 17/830,462

(22) Filed: Jun. 2, 2022

(65) Prior Publication Data
US 2022/0389672 A1 Dec. 8, 2022

(30) Foreign Application Priority Data
Jun. 8, 2021 (DE) ...................... 10 2021 114 706.9

(51) Int. Cl.
*E01C 23/088* (2006.01)
*B65G 41/00* (2006.01)
*E01C 23/12* (2006.01)

(52) U.S. Cl.
CPC .......... *E01C 23/088* (2013.01); *B65G 41/002* (2013.01); *E01C 23/127* (2013.01)

(58) Field of Classification Search
CPC .... B65G 41/002; B65G 11/12; B65G 11/126; B65G 21/12; B65G 41/007; B65G 41/008; E01C 23/088; E01C 23/127
See application file for complete search history.

(56) References Cited

U.S. PATENT DOCUMENTS

| 3,292,724 A | * | 12/1966 | Fryer | ...................... B62D 12/00 |
| | | | | 180/420 |
| 5,178,253 A | * | 1/1993 | Fix | ......................... B65G 21/14 |
| | | | | 198/861.6 |

(Continued)

FOREIGN PATENT DOCUMENTS

| DE | 1784753 A1 | 11/1971 |
| DE | 102016015482 A1 | 6/2018 |

(Continued)

OTHER PUBLICATIONS

Extended EP search report for corresponding patent application No. 22174098.8, dated Oct. 21, 2022, 6 pages (not prior art).

*Primary Examiner* — Janine M Kreck
*Assistant Examiner* — Michael A Goodwin
(74) *Attorney, Agent, or Firm* — Lucian Wayne Beavers; Patterson Intellectual Property Law PC

(57) ABSTRACT

A self-propelled milling machine has a machine frame 4 supported by running gears 6A, 6B, a working device 5 provided on the machine frame 4 for working the ground, and a conveyor device 12 for removing material. The conveyor device 12 has a boom 13 which is mounted on the machine frame 4 so as to pivot about an axis of rotation X which is perpendicular to the machine frame. The pivoting apparatus 16 for the boom 13 is characterised by at least one mechanism 16A, 16B having a plurality of mechanism links and the joints A, B, C, D connecting them and at least one linear drive 17A, 17B for driving at least one of the mechanism links. The mechanism may be designed as a planar four-link pivot joint mechanism 16A, 16B, the machine frame 4 forming a mechanism link of the pivot joint mechanism.

20 Claims, 11 Drawing Sheets

(56) References Cited

U.S. PATENT DOCUMENTS

| | | | |
|---|---|---|---|
| 9,915,043 B2 | 3/2018 | Berning et al. | |
| 2006/0061204 A1* | 3/2006 | Murray | E01C 23/088 299/39.2 |
| 2007/0284215 A1* | 12/2007 | Rudge | B65G 41/002 198/313 |
| 2016/0137422 A1* | 5/2016 | Husar | B65G 41/002 299/39.2 |
| 2018/0023261 A1* | 1/2018 | Hirman | E01C 23/088 299/39.2 |

FOREIGN PATENT DOCUMENTS

| | | | |
|---|---|---|---|
| WO | 0131301 A1 | 5/2001 | |
| WO | 2014029824 A1 | 2/2014 | |

\* cited by examiner

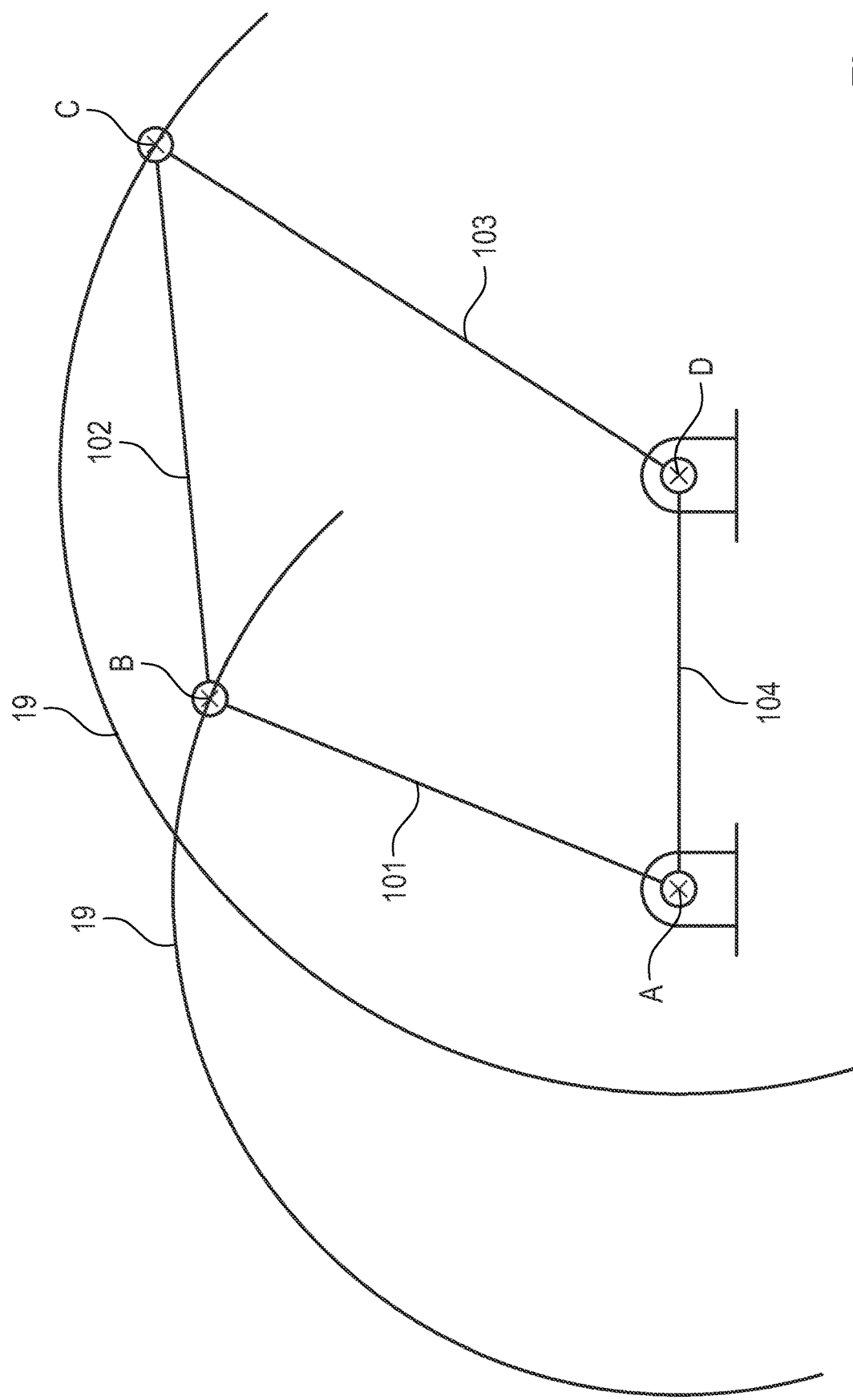

SELF-PROPELLED MILLING MACHINE HAVING A MACHINE FRAME AND A CONVEYOR DEVICE FOR REMOVING MATERIAL

BACKGROUND OF THE INVENTION

Field of the Invention

The invention relates to a self-propelled milling machine, in particular to a road milling machine or a surface miner, which milling machine has a height-adjustable machine frame supported by running gears, a working device provided on the machine frame for working the ground, and a conveyor device for removing material.

Description of the Prior Art

The known self-propelled milling machines generally have a machine frame which is supported by a chassis having a plurality of crawler tracks. Self-propelled milling machines are known which have a working device for working the ground, for example for removing damaged road layers (road milling machine) or for mining mineral resources (surface miner). The working device of the road milling machines and surface miners has a milling drum which is arranged on the machine frame. The individual running gear units of the road milling machines and surface miners are assigned lifting devices comprising piston/cylinder arrangements in order to be able to lower, lift, or incline the machine frame together with the milling drum in relation to the ground (soil surface).

To transport the milled or mined material, road milling machines and surface miners have a conveyor device that has a boom that is pivotable to both sides with an endlessly circulating conveyor belt, so that, during operation of the milling machine, the loose material (bulk material) can be dropped onto the loading surface of a moving transport vehicle (truck) moving together with the milling machine. The boom of a road milling machine generally has a bracket which is mounted on the machine frame so as to pivot about an axis of rotation which is substantially perpendicular to the machine frame. A pivoting apparatus which is driven by a drive unit is provided for pivoting the boom. In general, an operating unit is provided on which the position of the boom can be adjusted by the machine operator. However, assistance systems are also known which relieve the machine operator of this task.

The machine operator should be able to adjust the angle of the boom easily and precisely, and the boom should have enough pivoting range to safely dump the material onto the loading surface of the truck.

WO 01/31301 A1 describes a road milling machine having a conveyor device that has a pivotable boom. The pivoting apparatus comprises a piston/cylinder arrangement, the piston of which is articulated to a bracket of the boom and the cylinder of which is articulated to the machine frame. The bracket is pivoted by moving the piston in and out. WO 2014/029824 A1 (U.S. Pat. No. 9,915,043) discloses a road milling machine having a pivoting apparatus for the boom, which road milling machine has two piston/cylinder arrangements, one of which is arranged on one side and the other on the other side of the longitudinal center plane of the machine frame.

The pivoting apparatuses for road milling machines described above have a simple structure. The disadvantage, however, is that the torque that is applied with the piston/cylinder arrangement that exerts a constant force is not largely constant over the entire pivoting range. The torque is greatest in the pivoting range of minimum deflection and smallest in the range of maximum deflection. Due to the high torques, the piston/cylinder arrangement must be adequately dimensioned, thereby resulting in higher costs, greater weight, and greater space requirements.

U.S. Pat. No. 5,178,253 A1 describes a pivoting apparatus for a milling machine having a first piston/cylinder arrangement on one side and a second piston/cylinder arrangement on the other side of the longitudinal center plane of the machine frame, the cylinder of the first and second piston/cylinder arrangements being articulated to the machine frame. The piston of each piston/cylinder arrangement is articulated to one end of a mechanism link, the other end of which is articulated to the boom. The boom is pivoted to one side when the piston of the first piston/cylinder arrangement is retracted, and the boom is pivoted to the other side when the piston of the second piston/cylinder arrangement is retracted. When the piston of one piston/cylinder arrangement is retracted, the piston of the other piston/cylinder arrangement is pulled out of the cylinder. Consequently, only one of both piston/cylinder arrangements exerts a pulling force. Since one piston/cylinder arrangement is not supported by the other, the piston/cylinder arrangements and the associated hydraulics must be dimensioned sufficiently in order to be able to apply the required forces.

SUMMARY OF THE INVENTION

The object of the invention is to improve the pivoting apparatus of a conveyor device of a self-propelled milling machine. One object of the invention is in particular to simplify the operation of the pivoting apparatus, so that the position of the boom can be set easily and precisely by the machine operator.

This object is achieved according to the invention by the features in accordance with claim 1. The subject matter of the dependent claims relates to particular embodiments of the invention.

The self-propelled milling machine according to the invention, in particular a road milling machine or surface miner, has a machine frame supported by running gears, a working device provided on the machine frame for working the ground, and a conveyor device for removing material (bulk material), the conveyor device having a boom which is mounted on the machine frame so as to pivot about an axis of rotation which is substantially perpendicular to the machine frame.

In this context, a pivotable boom is understood to be any projecting component that can be pivoted by a specific pivoting angle in a plane running transversely to the longitudinal center plane of the machine frame, i.e. a horizontal plane in the case of a horizontal alignment of the machine frame. However, the boom can also be pivotable by a specific tilting angle in a vertical plane perpendicular thereto.

The pivoting apparatus of the milling machine according to the invention comprises at least one mechanism having a plurality of mechanism links and the joints connecting them and at least one linear drive for driving at least one of the mechanism links.

The mechanism of the pivoting apparatus allows user-friendly operation by the machine operator. The pivoting apparatus is distinguished by the fact that the boom can be pivoted at largely the same speed over the entire pivoting range. Therefore, the machine operator can adjust the boom easily and precisely. The mechanism prevents a movement of the linear drive at a specific angle, for example at a maximum or minimum deflection, from resulting in a particularly rapid pivoting movement. In addition, with the pivoting apparatus according to the invention, a largely constant torque can always be exerted on the boom over the entire pivoting range.

A linear drive is understood to mean all drive means that result in a translational movement. These drive means include, for example, piston/cylinder arrangements or threaded rod mechanisms.

In a preferred embodiment, the mechanism of the pivoting apparatus is designed as a planar four-link pivot joint mechanism, the machine frame forming a mechanism link of the pivot joint mechanism. A particularly preferred embodiment provides that the pivoting apparatus has a first four-link pivot joint mechanism and a second four-link pivot joint mechanism, the first and second pivot joint mechanisms being arranged mirror-symmetrically to a longitudinal center plane of the machine frame. In an embodiment with two pivot joint mechanisms, both mechanisms can have at least one common mechanism link and/or joint.

A particular advantage of the pivoting apparatus according to the invention is that the linear drive for driving one of the mechanism links can act in both directions. It is therefore possible that the pivoting apparatus can comprise only one four-link pivot joint mechanism with which the boom can be pivoted in both directions. However, if the milling machine has two four-link pivot joint mechanisms, both drive units can be dimensioned smaller because they support each other, thereby saving space and costs.

With the four-link pivot joint mechanism, the speed at which the boom can be pivoted is relatively constant over the entire pivoting range. Therefore, in practice, the boom can be pivoted to the desired position accurately and safely by the machine operator, thereby improving the operability (handling) of the milling machine. Furthermore, the four-link pivot joint mechanism allows a relatively even torque curve over the entire pivoting range. Finally, the four-link pivot joint mechanism results in an increased pivoting range.

In one embodiment, the first and/or second four-link pivot joint mechanisms comprise a first mechanism link, one end of which is articulated to the machine frame by a first joint and the other end of which is articulated to one end of a second mechanism link by a second joint, the other end of which is articulated to one end of a third mechanism link by a third joint, the other end of which is articulated to the machine frame by a fourth joint.

The mechanism links and joints can have various designs. For example, the mechanism links can be formed by rods, plates, belts, or parts of the machine frame and/or the boom. The joints can have pins and bushings. The first mechanism link of the first and/or second four-link pivot joint mechanism can be formed by one rod and the second mechanism link of the first and/or second four-link pivot joint mechanism can be formed by two spaced-apart rods, one end of the rod of the first mechanism link being rotatably mounted between the ends of the two rods of the second mechanism link. However, it is also possible for the first mechanism link to be formed by two rods arranged spaced apart from one another and for the second mechanism link to be formed by one rod, one end of the rod of the second mechanism link being rotatably mounted between the ends of the two rods of the first mechanism link.

The linear drive may have a first piston/cylinder arrangement, the piston of which is articulated at one end to the machine frame, and the cylinder of which is articulated at one end to one of the mechanism links of the first four-link pivot joint mechanism, and/or may have a second piston/cylinder arrangement, the piston of which is articulated at one end to the machine frame, and the cylinder of which is articulated at one end to one of the mechanism links of the second four-link pivot joint mechanism. Alternatively, the linear drive may have a first piston/cylinder arrangement, the cylinder of which is articulated at one end to the machine frame, and the piston of which is articulated at one end to one of the mechanism links of the first four-link pivot joint mechanism, and may have a second piston/cylinder arrangement, the cylinder of which is articulated at one end to the machine frame, and the piston of which is articulated at one end to one of the mechanism links of the second four-link pivot joint mechanism.

The piston or cylinder of the first or second piston/cylinder arrangement, respectively, may be articulated at one end to the second mechanism link of the first or second four-link pivot joint mechanism. This connection allows an optimal transfer of the pulling or compressive forces with a relatively short overall length of the corresponding piston/cylinder arrangement. However, the piston or cylinder can also be articulated to the first or third mechanism link.

The second mechanism link may have a lug on which the piston or cylinder of the first or second piston/cylinder arrangement is articulated at one end to the second mechanism link of the first or second four-link pivot joint mechanism. However, the articulated connection of the piston/cylinder arrangement to the mechanism links can also be made directly at a joint of one of the mechanism links.

The boom can comprise a bracket and a frame, the bracket being fastened to the machine frame so as to rotate about a central horizontal axis, and the frame being mounted in the bracket so as to pivot about a vertical axis. The frame of the boom can accommodate a belt conveyor, for example. Booms of this type belong to the prior art.

One embodiment provides that the third mechanism link of the first and second four-link pivot joint mechanism is formed by a bracket provided on the boom, the bracket being mounted on the machine frame so as to pivot about an axis of rotation which lies in the longitudinal center plane of the machine frame.

A largely constant pivoting speed and an even torque curve with a sufficiently large pivoting angle can be achieved if, with a pivoting angle of zero, i.e. when the boom is not pivoted, the first and second piston/cylinder arrangements enclose an angle $\alpha$ of between 40° and 80°, preferably between 50° and 70°, and/or the first mechanism link of the first and second four-linked pivot joint mechanisms enclose an angle $\alpha$ of between 20° and 50°, preferably between 30° and 40°, when the boom is not pivoted, and/or the second mechanism link of the first and second four-link pivot joint mechanisms enclose an angle $\alpha$ which is between 70° and 110°, preferably between 80° and 100°, when the boom is not pivoted.

The first joint of the first and second four-link pivot joint mechanism preferably lie in a transverse plane of the machine frame, which plane is perpendicular to the longitudinal center plane. Depending on the available space, the first joints of the two pivot joint mechanisms can also be offset from one another in the longitudinal direction of the machine frame. But they can also form a common joint. The third joint of the first and second four-link pivot joint mechanism preferably form a common joint. However, they can also be joints which are offset from one another.

In a further embodiment, the milling machine has a hydraulic unit for actuating the first and second piston/ cylinder arrangements, which hydraulic unit is designed such that, in a first operating mode, the piston of the first piston/cylinder arrangement is extended and the piston of the second piston/cylinder arrangement is retracted, so that the boom is pivoted to one side, and, in a second operating mode, the piston of the first piston/cylinder arrangement is retracted and the piston of the second piston/cylinder arrangement is extended, so that the boom is pivoted to the other side. Since the piston/cylinder arrangements are double-acting piston/cylinder arrangements, the forces acting on the first and second piston/cylinder arrangements are smaller than if only one of the two piston/cylinder arrangements were active during a pivoting movement in one direction, so that the piston/cylinder arrangements and the associated hydraulic unit can be dimensioned smaller accordingly.

An operating unit which interacts with the hydraulic unit and has at least one operating element, for example a control lever, switch, button, etc., can be provided for the machine operator. The operating unit can be designed such that the at least one operating element assumes a first position for pivoting the boom in one direction and a second position for pivoting the boom in the other direction, so that the hydraulic unit fills hydraulic fluid into the respective cylinder chambers of the relevant piston/cylinder arrangements.

BRIEF DESCRIPTION OF THE DRAWINGS

An embodiment of the invention is explained in more detail below with reference to the drawings in which:

FIG. 4 is a schematic representation of the planar four-link pivot joint mechanism of the pivoting apparatus of FIG. 2;

DETAILED DESCRIPTION

Figure 1:
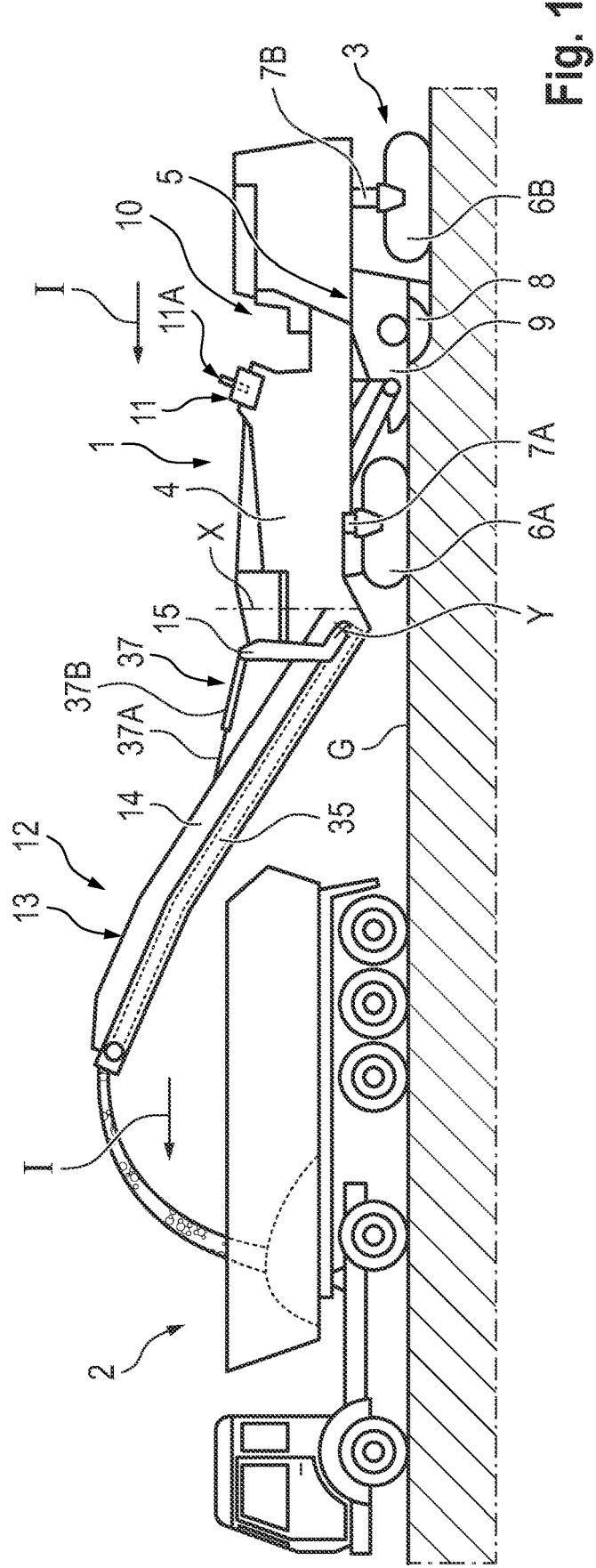
FIG. 1 is a side view of a self-propelled milling machine with a conveyor device together with a transport vehicle.

FIG. 1 is a side view of a self-propelled milling machine 1 together with a transport vehicle 2. The milling machine 1 has a machine frame 4 supported by a chassis 3, on which machine frame a working device 5 is arranged, by means of which the work required for the construction project can be carried out.

In the working direction I, the milling machine 1 has a front left running gear 6A and a front right running gear and a rear left running gear 6B and a rear right running gear, to which running gears a front, left lifting device 7A and front, right lifting device and a rear, left lifting device 7B and rear, right lifting device are assigned in the working direction I, so that the height and inclination of the machine frame 4 in relation to the ground G can be varied by retracting or extending the lifting devices. The running gears 6A and 6B may be referred to as ground engaging units 6A and 6B.

The milling machine 1 is a road milling machine for milling off road surfaces (large milling machine), in which road milling machine the working device 5 has a milling drum 8 which is arranged in a milling drum housing 9 (which is only indicated in outline) between the front and rear running gears. Above the milling drum housing 9, the machine operator's stand 10 is located on the machine frame, the stand having an operating unit 11 for the machine operator. The operating unit has operating elements 11A.

In order to remove the milled material, the road milling machine has a conveyor device 12 which comprises a boom 13 which has a frame 14 on which an endlessly circulating conveyor belt 35 (indicated in dashed lines) is arranged. The boom 13 has a bracket 15 which is mounted on the front side of the machine frame 4 so as to pivot about an axis of rotation X that is substantially perpendicular to the machine frame, so that the boom 13 can pivot in a horizontal plane.

Since the road milling machine or the surface miner is a front-loading milling machine, the transport vehicle 2 on which the milled material is loaded as bulk material drives ahead of the milling machine. However, the road milling machine or the surface miner can also be a rear-loading milling machine in which the bracket 15 of the boom 13 is mounted at the rear of the milling machine so as to pivot about an axis of rotation that is substantially perpendicular to the machine frame.

The terms "vertical" and "horizontal" used below refer to a planar contact surface for the milling machine and assume that the machine frame is not inclined in the longitudinal and/or transverse direction in relation to the ground.

The machine operator can adjust the horizontal pivoting position of the boom 13 by actuating operating elements 11A of the operating unit 11. If the transport vehicle 2 is laterally offset from the road milling machine 1, the machine operator can pivot the boom 13 by the appropriate angle to one side or the other, so that the milled material can be dropped onto the loading surface of the transport vehicle.

A pivoting apparatus 16 (not shown in FIG. 1) is provided for pivoting the boom 13 in the horizontal plane, which pivoting apparatus will be described in detail with reference to FIGS. 2 to 8. The boom 13 can also be pivoted in a vertical plane. For this purpose, the frame 14 of the boom 13 is mounted on the bracket 15 so as to pivot about a horizontal axis Y. The height adjustment of the boom 13 takes place with a piston-cylinder arrangement 37, the piston 37A of which is articulated to the frame 14 of the boom 13, and the cylinder 37B of which is articulated to the bracket 15. However, this pivoting apparatus is not the subject matter of the invention.

The drive power for the travel drive and the working device as well as other units of the milling machine are provided by an internal combustion engine (not shown in FIG. 1).

Figure 2:
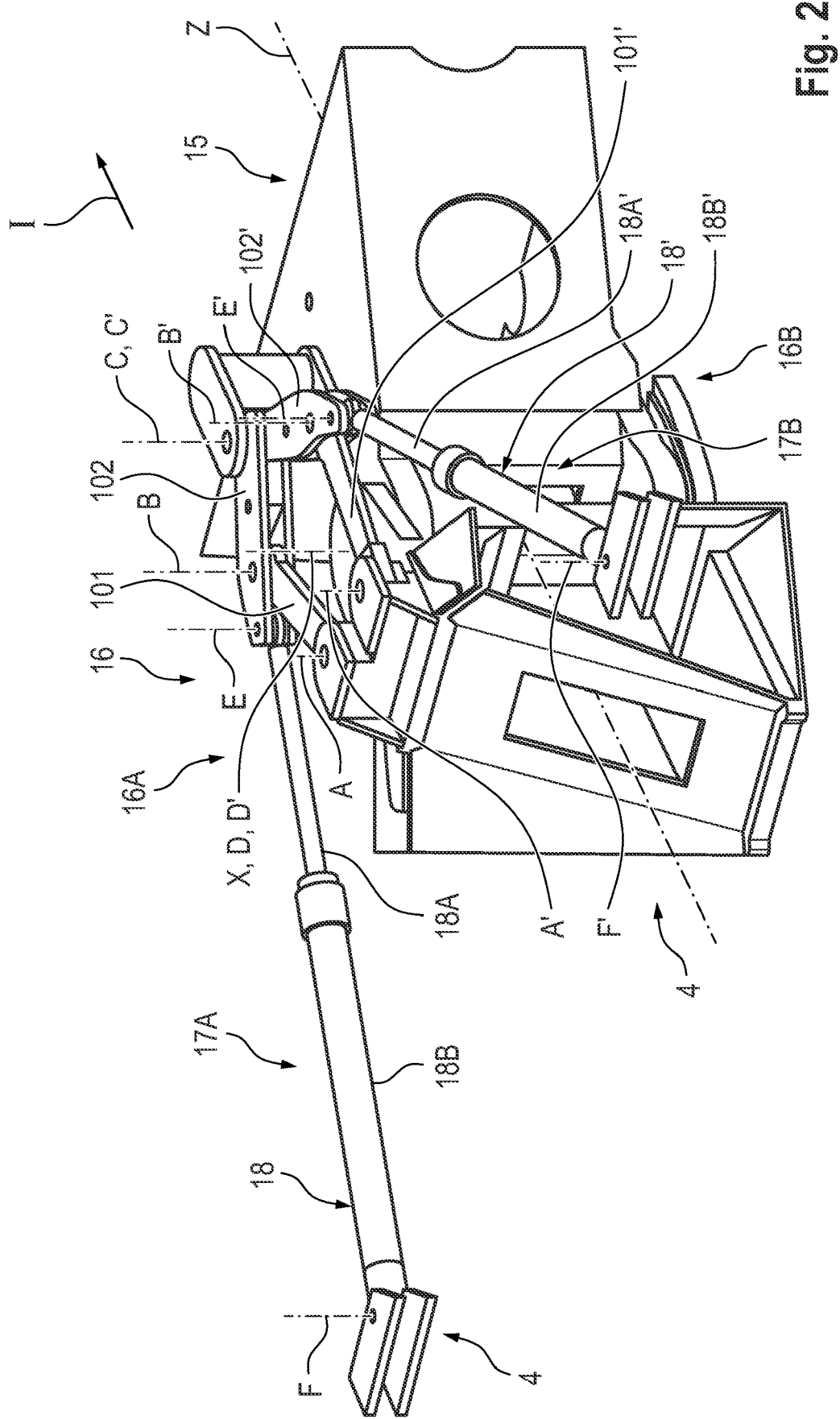
FIG. 2 is an embodiment of a pivoting apparatus according to the invention of the self-propelled milling machine in a perspective view.

FIG. 2 shows a part of the machine frame 4 and a part of the bracket 15 of the boom 13 of the milling machine according to the invention and the pivoting apparatus 16 according to the invention in a perspective view. It is irrelevant for the invention how the corresponding part of the machine frame and the bracket is designed. In this respect, the specific design of these parts shown in FIG. 2 is to be understood only as an example. It is also irrelevant whether the bracket is fastened to the front or rear of the milling machine (front loader or rear loader).

Figure 3:
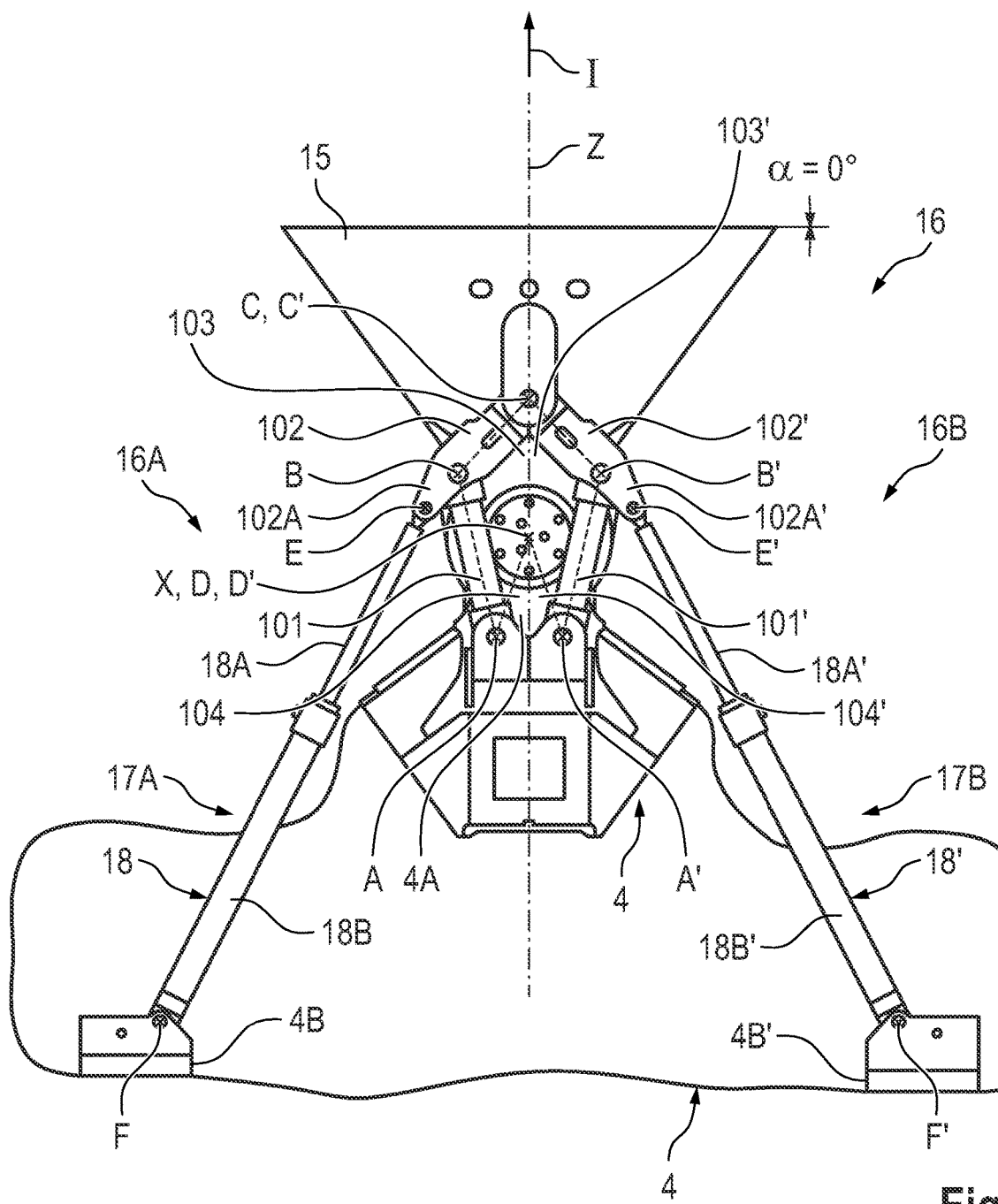
FIG. 3 is a plan view of the pivoting apparatus from FIG. 2.
Figure 5A:
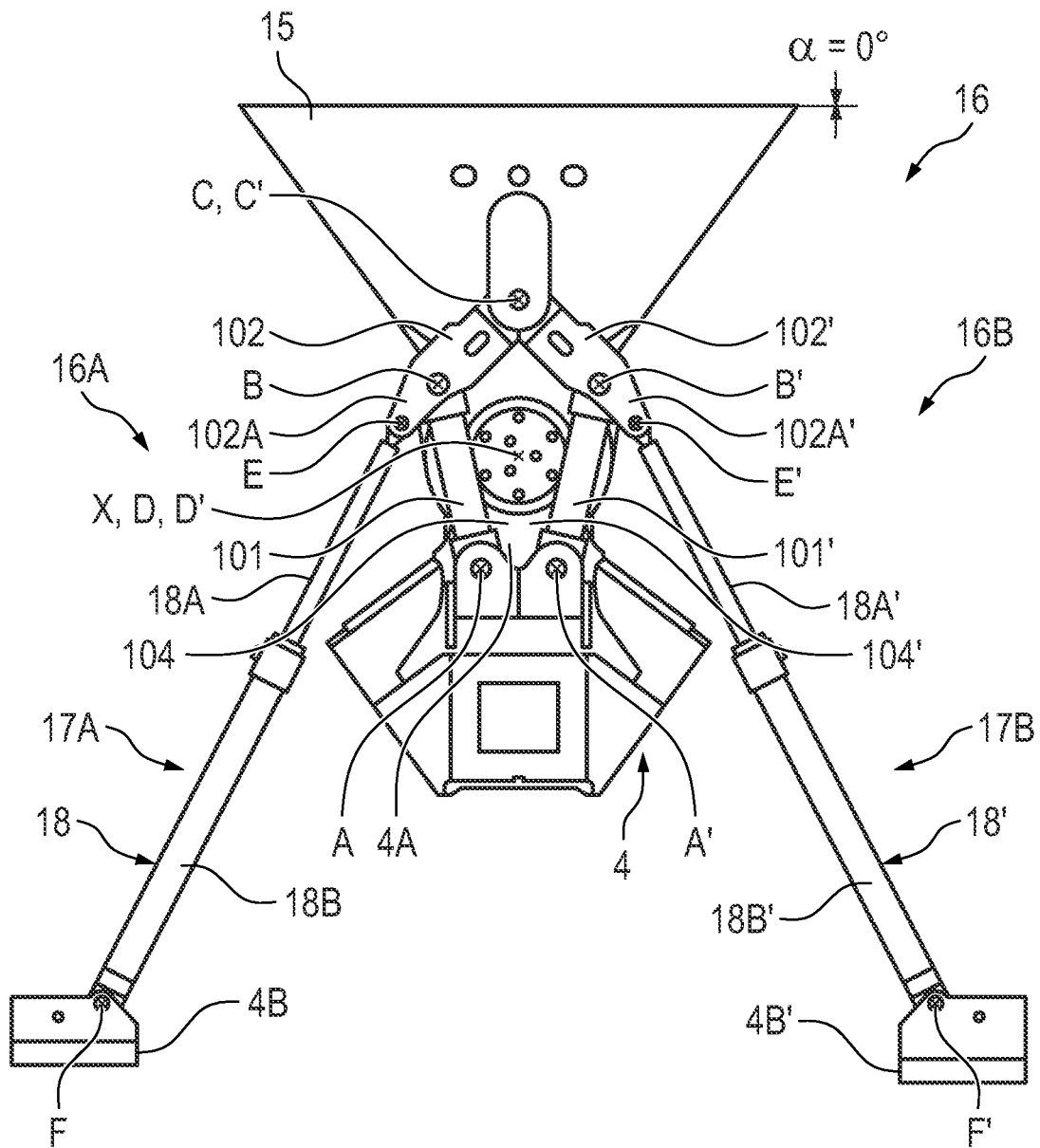
FIG. 5A shows the pivoting apparatus according to the invention, wherein the bracket of the boom is not pivoted.
Figure 5B:
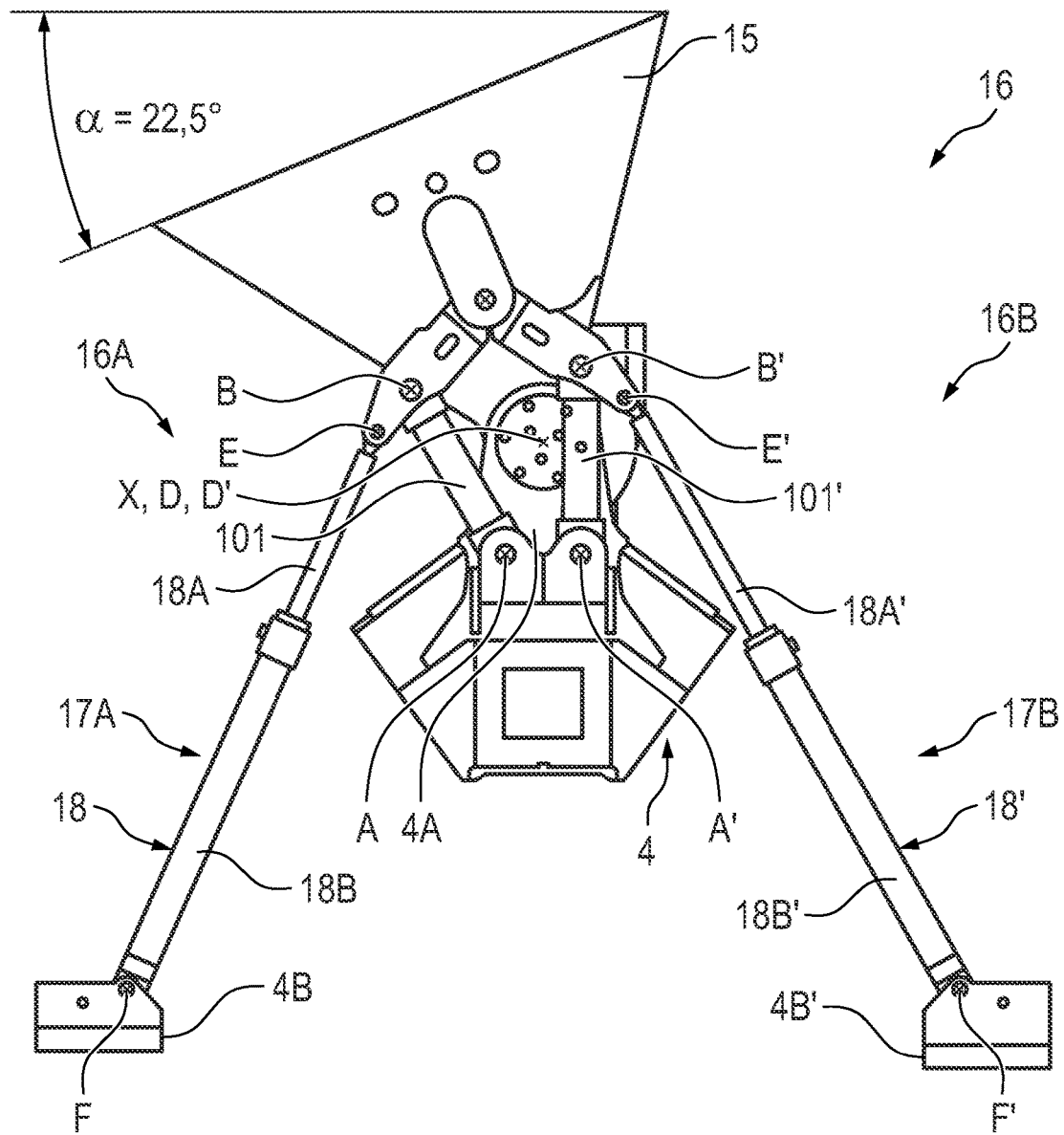
FIG. 5B shows the pivoting apparatus, wherein the bracket of the boom is pivoted through a first angle.
Figure 5C:
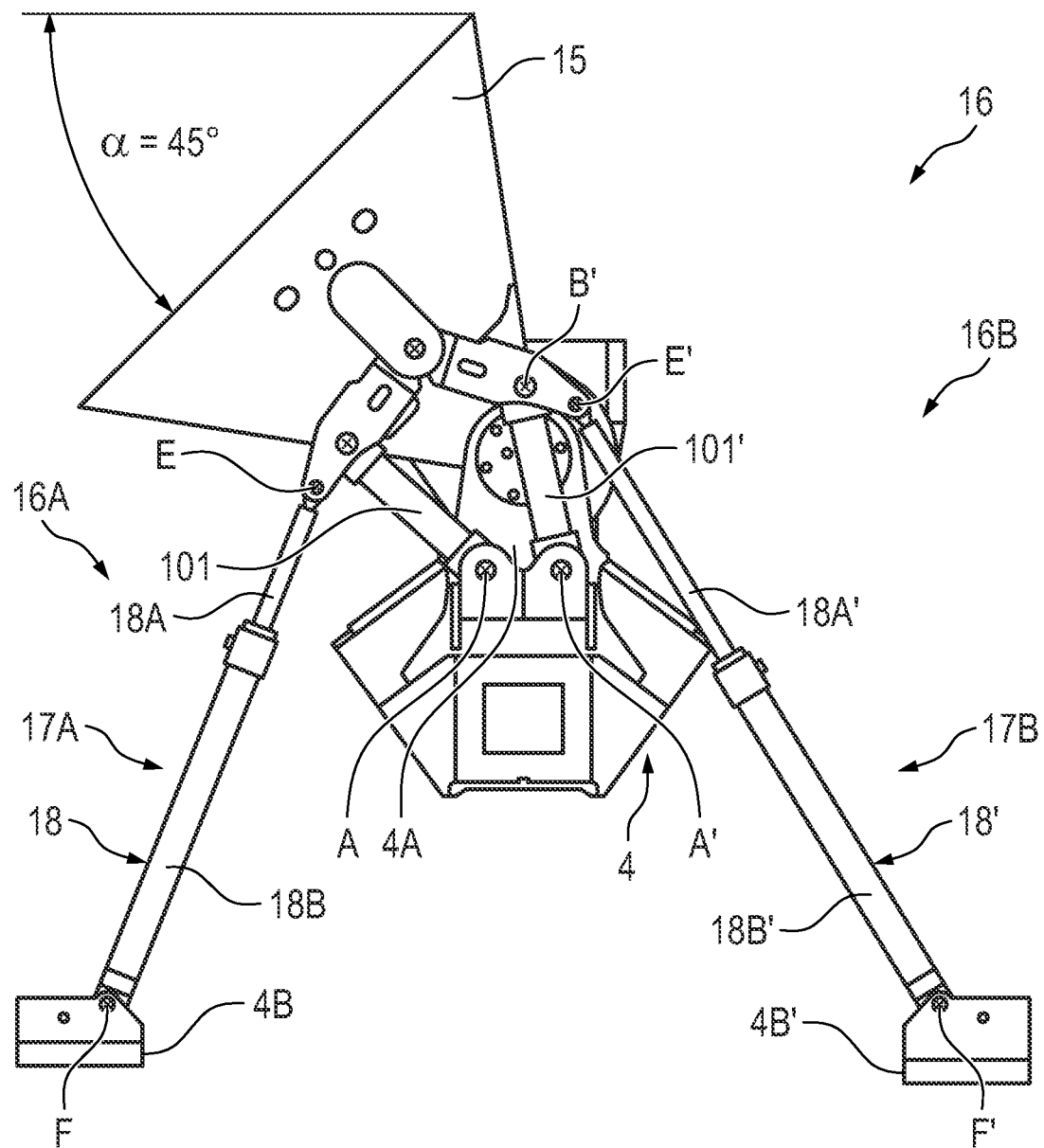
FIG. 5C shows the pivoting apparatus, wherein the bracket of the boom is pivoted through a second angle that is greater than the first angle.
Figure 5D:
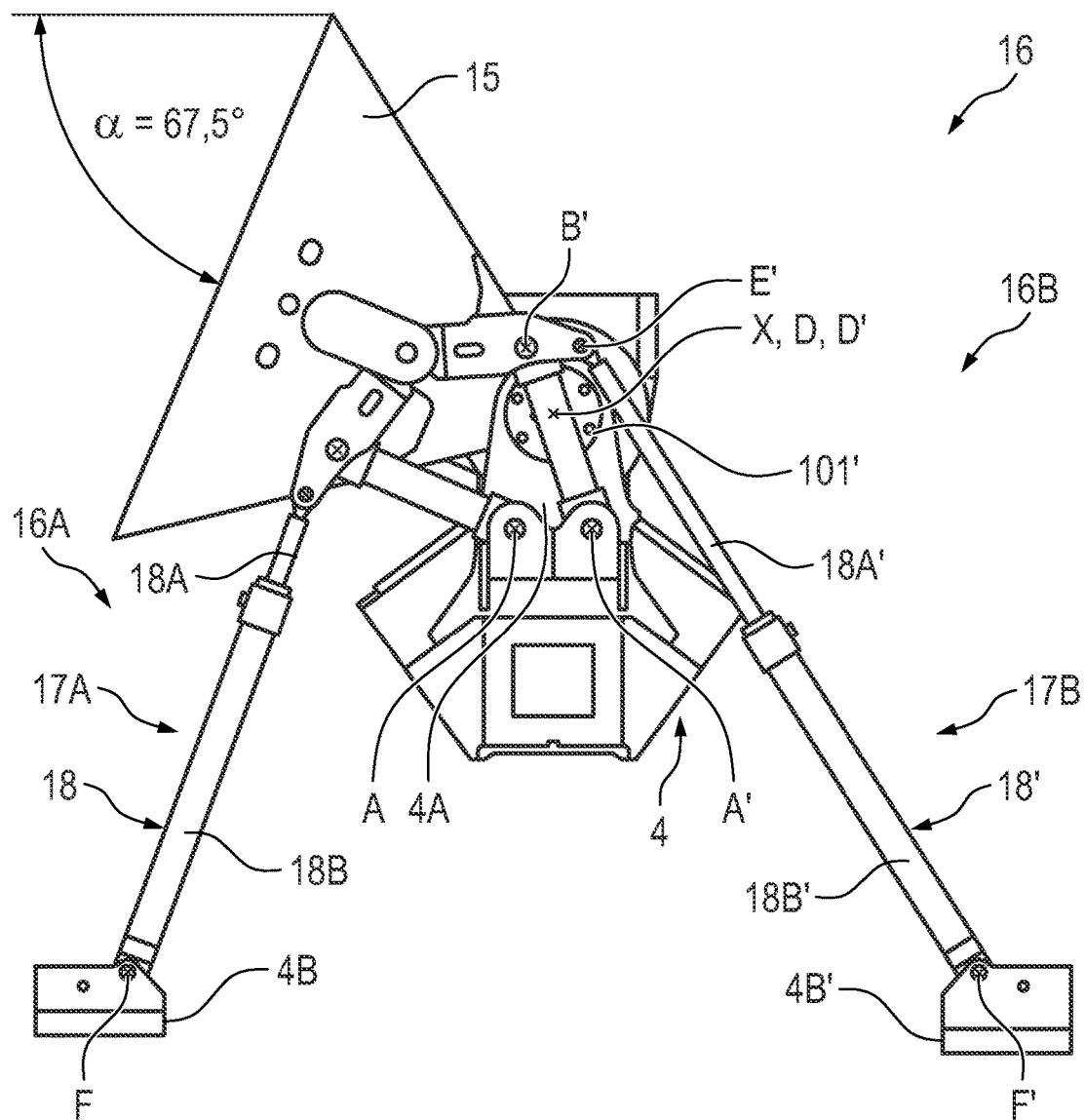
FIG. 5D shows the pivoting apparatus, wherein the bracket of the boom is pivoted through a third angle that is greater than the second angle.
Figure 5E:
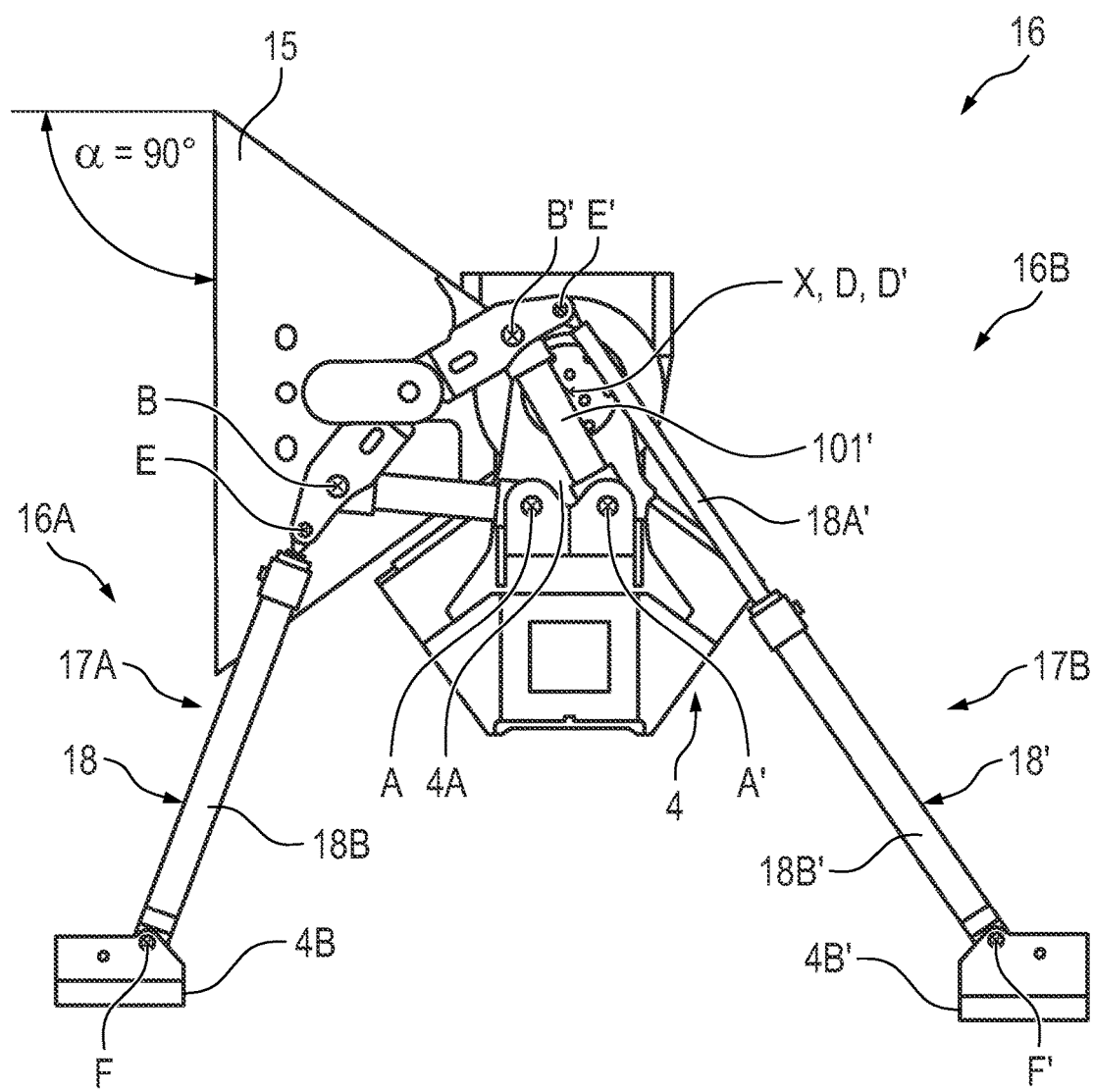
FIG. 5E shows the pivoting apparatus, wherein the bracket of the boom is pivoted through a fourth angle that is greater than the third angle.

FIG. 3 shows the pivoting apparatus 16 in a plan view, the bracket 15 and thus the boom 13 being in the starting position (pivoting angle α=0°). In the case of a front-loading milling machine, the designations "left" and "right" below refer to the working direction I of the milling machine. The central vertical axis of rotation X of the bracket 15 lies in the longitudinal center plane of the machine frame 4, in which plane the longitudinal axis Z of the machine frame lies. The pivoting apparatus 16 which has a mirror-symmetrical structure with respect to the longitudinal center plane, comprises a first, in FIG. 3 left, planar four-link pivot joint mechanism 16A and a second, in FIG. 3 right, planar four-link pivot joint mechanism 16B as well as a left linear drive 17A for driving the left mechanism 16A and a right linear drive 17B for driving the right mechanism 16B. The left linear drive 17A and the right linear drive 17B can have piston/cylinder arrangements 18, 18'. It should be noted that the two linear drives work together and drive both mechanisms together. Even if there was only one linear drive, both mechanisms would be driven.

FIG. 4 shows a schematic representation of the individual mechanism links and joints of the two pivot joint mechanisms, the corresponding links and joints in FIGS. 3 and 4 being denoted by the same reference signs.

The left four-link pivot joint mechanism 16A comprises a first mechanism link 101, one end of which is articulated to the machine frame 4 by a first joint A, and the other end of which is articulated to one end of a second mechanism link 102 by a second joint B, the other end of which is articulated to one end of a third mechanism link 103 by a third joint C, the other end of which is articulated to the machine frame 4 by a fourth joint D. A fourth mechanism link 104 is formed by a part 4A of the machine frame 4 projecting from the front or rear of the milling machine. Consequently, the fourth mechanism link 104 is defined as a frame. The first mechanism link 101 is one flat rod (flat profile) and the second mechanism link 102 is formed by two flat rods (flat profiles) between which the first mechanism link 101 is rotatably mounted.

The central axis of rotation X of the bracket 15 of the boom 13 lies at the center of the projecting part 4A of the machine frame 4 in the longitudinal center plane, and the axis of rotation of the first joint A lies on the left side of the longitudinal center plane. When the bracket 15 is in the starting position, the axis of rotation of the third joint C lies in the longitudinal center plane.

The second mechanism link 102 has a lug 102A extending laterally beyond the second joint B outward to the left side. The free end of the piston 18A of the left piston/cylinder arrangement 18 is articulated at a joint E to the outer lug 102A of the second mechanism link 102, while the cylinder 18B of the left piston/cylinder arrangement 18 is articulated at a joint F to a bearing block 4B of the machine frame 4 (frame), which is shown in FIG. 3 only indicatively.

The right planar four-link pivot joint mechanism 16B has the same structure as the left pivot joint mechanism 16A. The mechanism links and joints of the right pivot joint mechanism are therefore denoted by primed reference signs.

The third joint C, C' and the fourth joint D, D' of the left and right pivot joint mechanisms 16A, 16B are each formed by a common pivoting joint C, C' and D, D'. The first joint A, A' of the left and right pivot joint mechanisms 16A, 16B lie on either side of the longitudinal center plane in a transverse plane transverse to the longitudinal center plane.

In the present embodiment, the left and right piston/cylinder arrangements 18, 18' of the left and right four-link pivot joint mechanism 16A, 16B enclose an angle of 54° when the boom 13 is not pivoted. The first mechanism link 101, 101' of the left and right four-link pivot joint mechanisms 16A, 16B enclose an angle of 24° when the boom 13 is not pivoted. The second mechanism link 102, 102' of the left and right pivot joint mechanisms 16A, 16B enclose an angle of approximately 90° when the boom 13 is not pivoted.

The running degree or degree of freedom F of the planar mechanism depends on the number n of links (including frame) and the number g of joints with the corresponding joint degree of freedom f. The pivoting joints have a joint degree of freedom f=1.

Grübler's running conditions apply to the two planar four-link pivot joint mechanisms 16A, 16B:

$$F=3(n-1)-2g \text{ where } n=4 \text{ and } g=4$$

$$F=1$$

With a degree of freedom F=1, the two pivot joint mechanisms 16A, 16B result in a forced operation. When the piston 18A of the left piston/cylinder arrangement 18 is extended, the bracket 15 pivots clockwise to the right, and when the piston 18A of the left piston/cylinder arrangement 18 is retracted, the bracket pivots counterclockwise to the left. When the piston 18A' of the right piston/cylinder arrangement 18' is extended, the bracket 15 pivots counterclockwise to the left, and when the piston 18A' of the right piston/cylinder arrangement 18' is retracted, the bracket pivots clockwise to the right. When the boom 13 is pivoted, the axes of the joints move on predetermined paths 19 (FIG. 4). When the piston of one piston/cylinder arrangement is extended, the piston of the other piston/cylinder arrangement is pressed into the cylinder and vice versa. Therefore, it is possible to pivot the boom 15 with only one pivot joint mechanism. However, the double pivot joint mechanism 16A, 16B has the advantage that both piston/cylinder arrangements 18, 18' can be actuated simultaneously, so that the forces to be applied for pivoting can be lower. Consequently, the piston/cylinder arrangements can be dimensioned smaller, which saves costs, weight, and space.

FIG. 5A to 5E show the movement of the boom 13 or the bracket 15 thereof when the piston/cylinder arrangements 18, 18' are actuated. It turns out that the pivoting apparatus 16 allows a relatively large pivoting angle of 90°.

Figure 6:
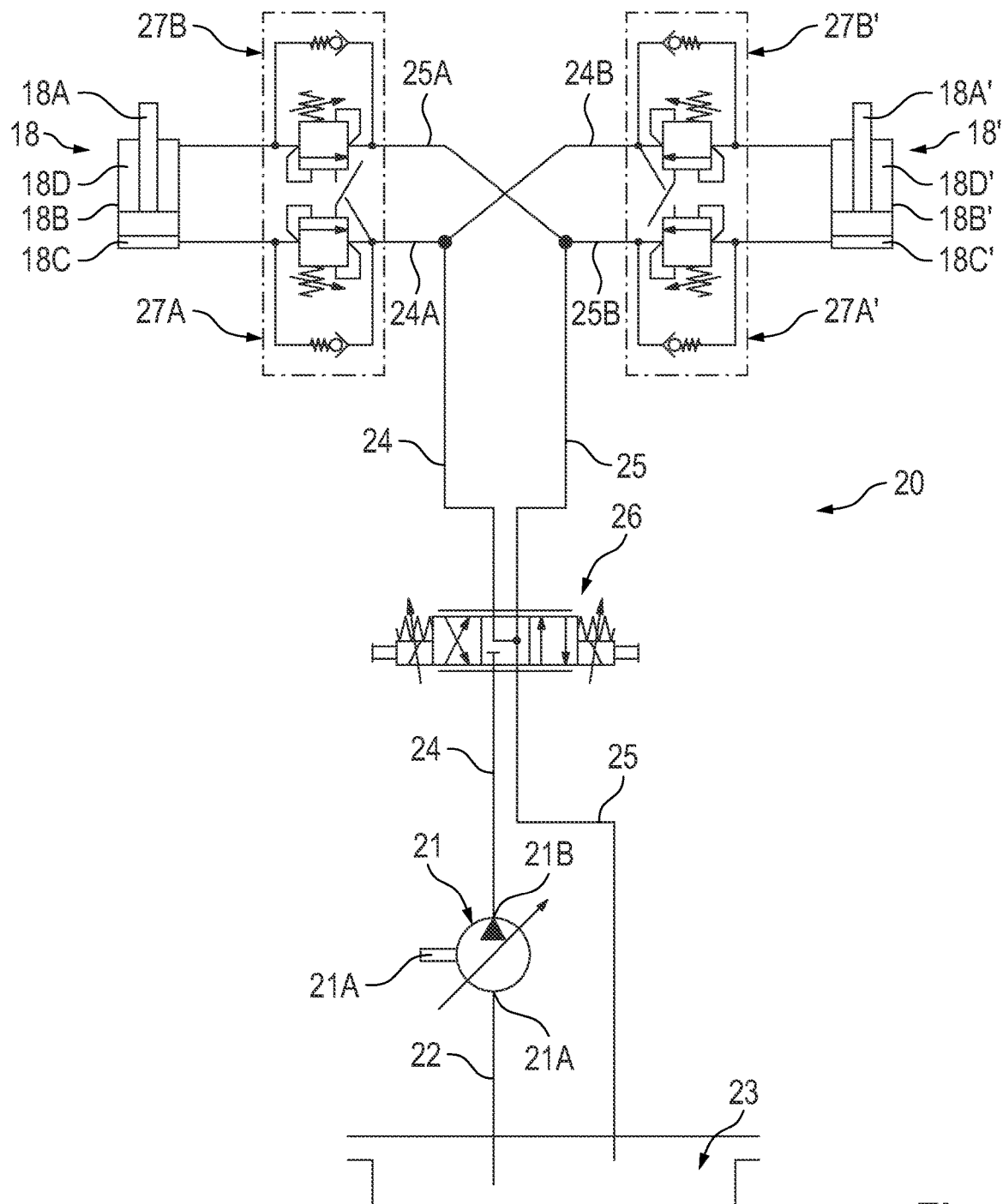
FIG. 6 shows a hydraulic circuit diagram of the hydraulic unit for actuating the piston/cylinder arrangements.

To actuate the piston/cylinder arrangements 18, 18', the milling machine has a hydraulic unit 20 which can be a constituent of the hydraulic system (not shown) of the milling machine. FIG. 6 shows the hydraulic circuit diagram of the hydraulic unit 20. The piston/cylinder arrangements 18, 18' are double-acting piston/cylinder arrangements each having a first chamber and a second chamber.

The hydraulic unit 20 has a hydraulic pump 21 which in the present embodiment is a variable displacement pump with an electromagnetically controlled, proportional pressure control valve which is controlled by a central control unit (not shown), so that the volume flow of the pump can be controlled. A suction line 22, which leads to a tank 23, is connected to the suction connection 21A of the hydraulic pump 21, so that the hydraulic pump can suck in hydraulic fluid from the tank. A first hydraulic line 24, which branches into a first line branch 24A and a second line branch 24B, is connected to the pressure connection 21B of the hydraulic pump 21, the first branch 24A being connected to a connection of the first chamber 18C of the first (left) piston/cylinder arrangement 18 and the second branch 24B being connected to a connection of the second chamber 18D' of the second (right) piston/cylinder arrangement 18'. From a connection of the second chamber 18D of the first piston/cylinder arrangement 18 and a connection of the first chamber 18C' of the second piston/cylinder arrangement 18', the line branches 25A, 25B of a second hydraulic line 25 lead to the tank 23. A 4/3-way proportional valve 26 is provided in the first and second hydraulic lines 24, 25, with which proportional valve the flow in the lines can be interrupted, established, or reversed depending on the position of the valve. Load holding valves 27A, 27B or 27A', 27B' are provided in the line branches 24A, 24B or 25A, 25B of the first and second hydraulic line 24 or 25 in order to prevent uncontrolled movements of the boom 13.

In one position, when the proportional valve 26 is actuated, hydraulic fluid flows into the first chamber 18C of the first piston/cylinder arrangement 18 and the second chamber 18D' of the second piston/cylinder arrangement 18' so that the first piston 18A is extended and the second piston 18A' is retracted, whereby the boom 13 pivots to the right. In the other position, hydraulic fluid flows into the second chamber 18D of the first piston/cylinder arrangement 18 and the first chamber 18C' of the second piston/cylinder arrangement 18', so that the first piston 18A is retracted and the second piston 18A' is extended, whereby the boom 13 pivots to the left.

In the present embodiment, the operating unit 11 which interacts with the control unit or the hydraulic unit has a control lever 11A which can be pivoted from a neutral position to the left or right. When the machine operators pivots the control lever to the left or right, the 4/3-way proportional valve 26 is actuated such that the boom 13 pivots to the left or right.

The pivoting apparatus 16 according to the invention is characterised in that the angular velocity at which the boom 13 rotates in one direction or the other is largely constant over the entire pivoting range. It should be noted in this case that this assumes a constant volume flow of the hydraulic fluid delivered by the hydraulic pump 21 or a constant actuation of the proportional valve or a constant deflection of the control lever. The sensitivity of the control of the boom results, on the one hand, from the fact that the directional valve is a proportional directional valve, which means that the machine operator can freely select the speed at which the boom is pivoted, and, on the other hand, from the fact that the mechanism is designed in such a way that, with a constant drive speed of the at least one linear drive, there is also a constant pivoting speed, so that the machine operator is not disturbed by fluctuating speeds when operating the control lever. Therefore, the pivoting apparatus allows for delicate control of the boom 13 by the machine operator.

Figure 7:
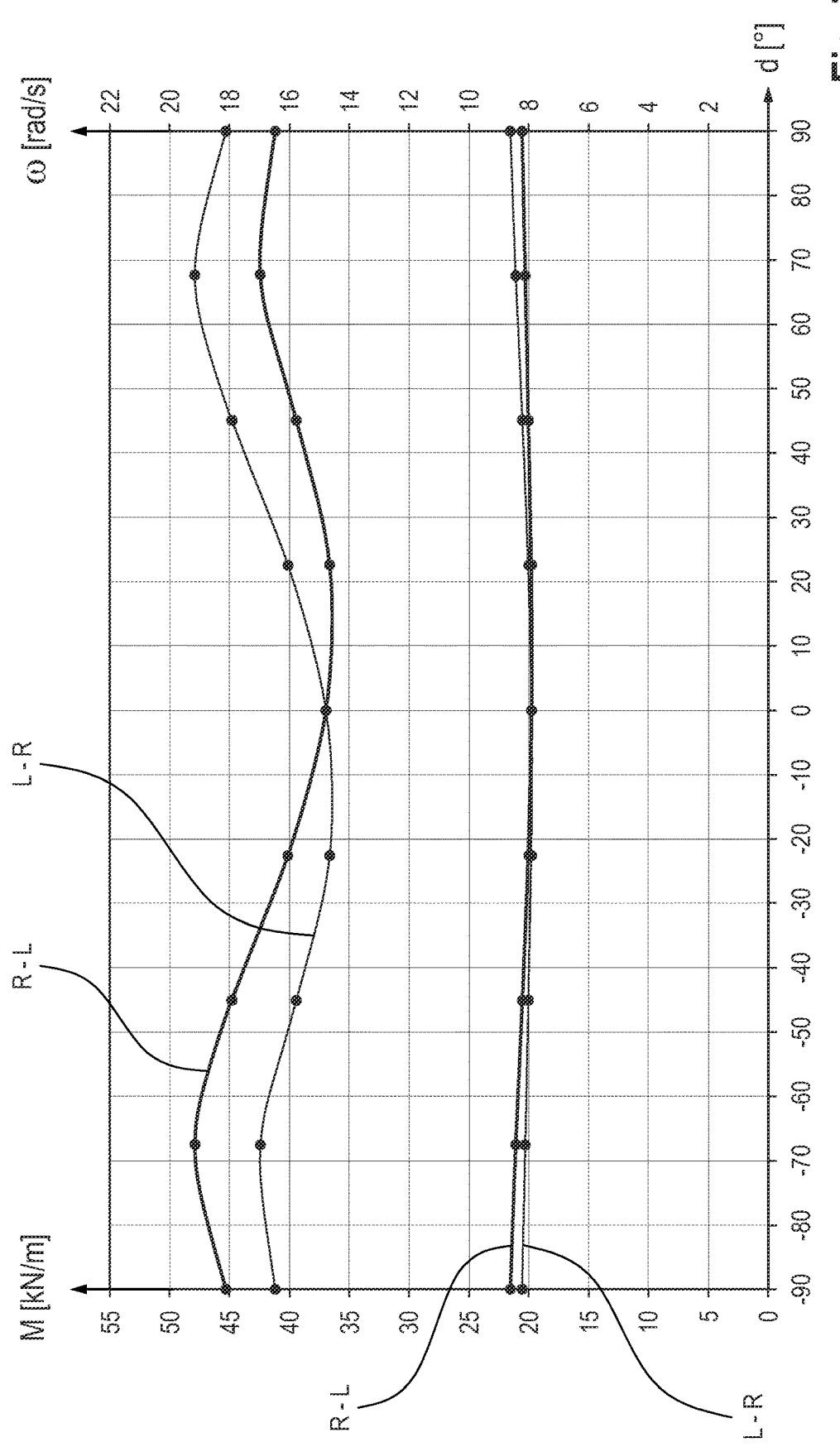
FIG. 7 is a graph showing the pivoting speed and the torque as a function of the pivoting angle.

FIG. 7 shows the angular velocity ω [°/s] of the boom 13 during a pivoting movement from right to left (diagram R-L) or a pivoting movement from left to right (diagram L-R) over an angular range of +90° to −90° and the torque curve M [kNm] for a pivoting movement from right to left (diagram R-L) or a pivoting movement from left to right (diagram L-R). It can be seen that the angular velocity ω is largely constant over the entire pivoting range and only increases slightly in both directions as the pivoting angle increases. In addition, the torque M applied by the piston/cylinder arrangements 18, 18' is varied only insignificantly over the entire pivoting range. In the present embodiment, the torque is not more than 50 kNm. Since the pressurisation with fluid acts in both directions and no large torques occur, the piston/cylinder arrangements 18, 18' can be dimensioned relatively small.

The invention claimed is:

1. A self-propelled milling machine, comprising:
    a machine frame;
    a plurality of ground engaging units configured to support the machine frame;
    a milling drum supported from the frame for milling a ground surface;
    a conveyor for removing material, the conveyor including a boom mounted on the machine frame to pivot relative to the machine frame about an axis of rotation; and
    a pivoting apparatus configured to pivot the boom relative to the machine frame, the pivoting apparatus including:
        at least one four-link pivot joint mechanism including four mechanism links and four joints connecting the mechanism links, each of the four mechanism links being fixed in length during pivoting of the boom; and
        at least one linear drive configured to drive at least one of the mechanism links.

2. The self-propelled milling machine of claim 1, wherein:
    the machine frame forms one of the mechanism links of the four-link pivot joint mechanism.

3. The self-propelled milling machine of claim 1, wherein:
    the at least one four-link pivot joint mechanism includes a first four-link pivot joint mechanism and a second four-link pivot joint mechanism, wherein the first and second four-link pivot joint mechanisms are arranged mirror-symmetrically to a longitudinal center plane of the machine frame.

4. The self-propelled milling machine of claim 3, wherein the first and second four-link pivot joint mechanisms each include:
    a first mechanism link, a second mechanism link and a third mechanism link;
    wherein one end of the first mechanism link is articulated to the machine frame by a first joint, another end of the first mechanism link is articulated to one end of the second mechanism link by a second joint, another end of the second mechanism link is articulated to one end of the third mechanism link by a third joint, and another end of the third mechanism link is articulated to the machine frame by a fourth joint.

5. The self-propelled milling machine of claim 4, wherein the at least one linear drive comprises:
    a first linear drive including a first piston/cylinder arrangement including a first cylinder and a first piston, one of the first cylinder and the first piston being articulated to the machine frame and the other of the first cylinder and the first piston being articulated to one of the mechanism links of the first four-link pivot joint mechanism; and
    a second linear drive including a second piston/cylinder arrangement including a second cylinder and a second piston, one of the second cylinder and the second piston being articulated to the machine frame and the other of the second cylinder and the second piston being articulated to one of the mechanism links of the second four-link pivot joint mechanism.

6. The self-propelled milling machine of claim 5, wherein:

the first and second piston/cylinder arrangements enclose an angle in a range from 40° to 80°, when the boom is aligned with the longitudinal center plane of the machine frame.

7. The self-propelled milling machine of claim 5, wherein:
the first and second piston/cylinder arrangements enclose an angle in a range from 50° to 70°, when the boom is aligned with the longitudinal center plane of the machine frame.

8. The self-propelled milling machine of claim 5, wherein:
the first mechanism links of the first and second four-link pivot joint mechanisms enclose an angle in a range from 20° to 50°, when the boom is aligned with the longitudinal center plane of the machine frame.

9. The self-propelled milling machine of claim 5, wherein:
the first mechanism links of the first and second four-link pivot joint mechanisms enclose an angle in a range from 30° to 40°, when the boom is aligned with the longitudinal center plane of the machine frame.

10. The self-propelled milling machine of claim 5, wherein:
the second mechanism links of the first and second four-link pivot joint mechanisms enclose an angle in a range from 70° to 110°, when the boom is aligned with the longitudinal center plane of the machine frame.

11. The self-propelled milling machine of claim 5, wherein:
the second mechanism links of the first and second four-link pivot joint mechanisms enclose an angle in a range from 80° to 100°, when the boom is aligned with the longitudinal center plane of the machine frame.

12. The self-propelled milling machine of claim 5, wherein:
the other of the first cylinder and the first piston is articulated to the second mechanism link of the first four-link pivot joint mechanism; and
the other of the second cylinder and the second piston is articulated to the second mechanism link of the second four-link pivot joint mechanism.

13. The self-propelled milling machine of claim 12, wherein:
the second mechanism link of the first four-link pivot joint mechanism includes a first lug on which the other of the first cylinder and the first piston is articulated; and
the second mechanism link of the second four-link pivot joint mechanism includes a second lug on which the other of the second cylinder and the second piston is articulated.

14. The self-propelled milling machine of claim 5, further comprising:
a hydraulic unit configured to actuate the first and second piston/cylinder arrangements such that in a first operating mode the first piston is extended and the second piston is retracted so that the boom is pivoted in a first direction, and in a second operating mode the first piston is retracted and the second piston is extended so that the boom is pivoted in a second direction.

15. The self-propelled milling machine of claim 14, further comprising:
at least one operating element operably associated with the hydraulic unit such that the at least one operating element assumes a first position for pivoting the boom in the first direction and a second position for pivoting the boom in the second direction.

16. The self-propelled milling machine of claim 4, wherein:
the first mechanism link is formed by one flat rod; and
the second mechanism link is formed by two spaced-apart flat rods, wherein one end of the one flat rod of the first mechanism link is rotatably mounted between the two spaced-apart flat rods of the second mechanism link.

17. The self-propelled milling machine of claim 4, wherein:
the third mechanism link is formed by a bracket on the boom; and
the bracket is mounted on the machine frame so as to pivot about the axis of rotation which lies in the longitudinal center plane of the machine frame.

18. The self-propelled milling machine of claim 4, wherein:
the first joints of the first and second four-link pivot joint mechanisms lie spaced apart from one another in a transverse plane of the machine frame, which transverse plane is perpendicular to the longitudinal center plane.

19. The self-propelled milling machine of claim 4, wherein:
the third joints of the first and second four-link pivot joint mechanisms form a common joint.

20. The self-propelled milling machine of claim 1, wherein:
the conveyor includes a conveyor belt mounted on the boom.

* * * * *